April 29, 1958
E. T. LORIG
2,832,228
APPARATUS FOR AUTOMATICALLY CENTERING
A MOVING ENDLESS BELT
Filed Aug. 3, 1955
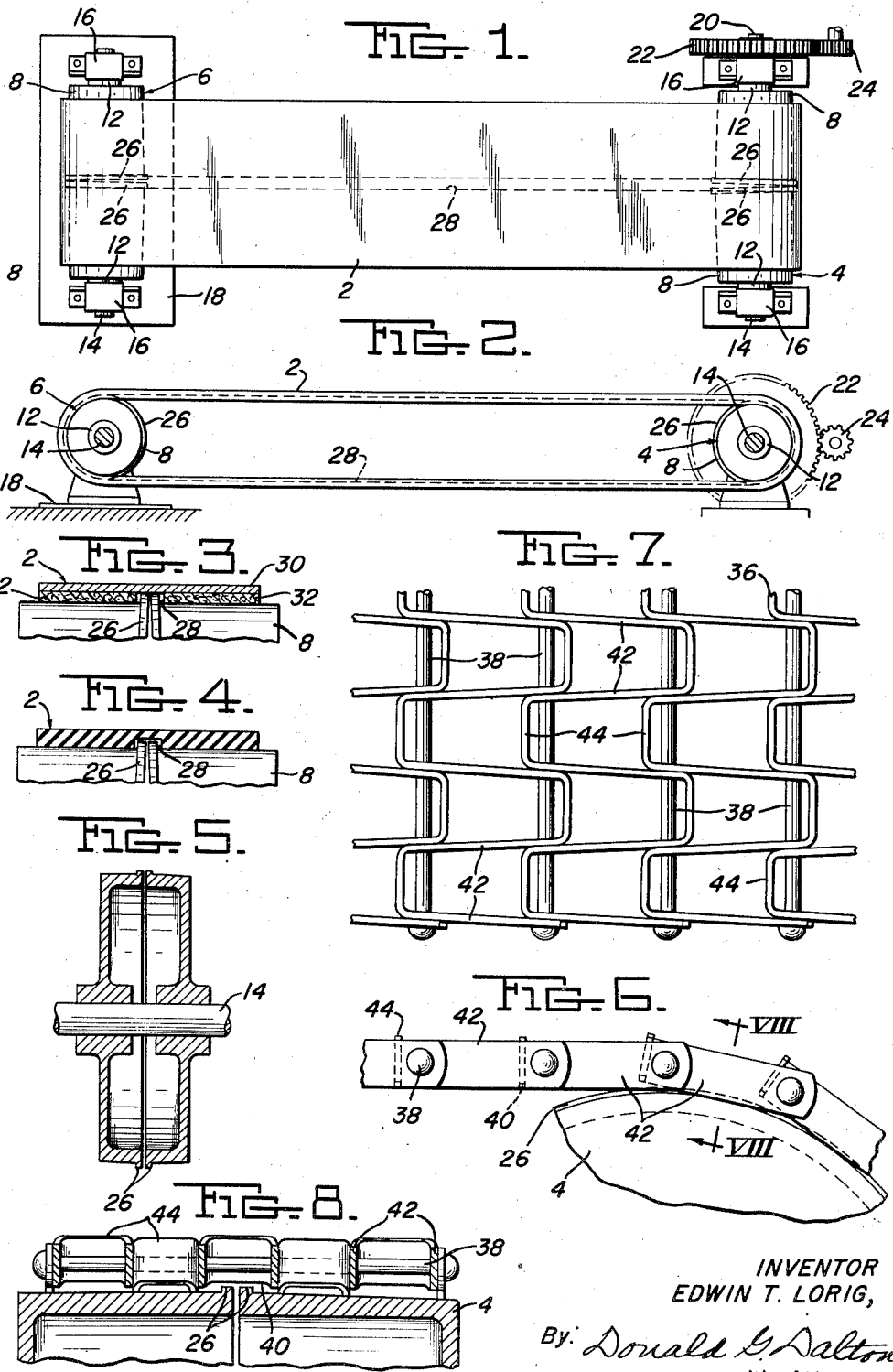
INVENTOR
EDWIN T. LORIG,
By: Donald G. Dalton
his Attorney.

United States Patent Office 2,832,228
Patented Apr. 29, 1958

2,832,228

APPARATUS FOR AUTOMATICALLY CENTERING A MOVING ENDLESS BELT

Edwin T. Lorig, Pittsburgh, Pa., assignor to United States Steel Corporation, a corporation of New Jersey Application August 3, 1955, Serial No. 526,273

1 Claim. (Cl. 74—240)

This invention relates to apparatus for automatically centering moving endless belts used in transmitting power or conveying material and is a continuation-in-part of my copending application Serial No. 287,777, filed May 14, 1952, now abandoned. In the past a great deal of trouble has been encountered in attempting to keep endless belts centered. At present, flexible belts depend upon rather highly crowned pulleys to secure sufficient distortion of the longitudinal fibers to obtain suitable tracking over the pulleys. This drastic deformation is detrimental to the life of the belt. Metallic belts cannot be used with crown rolls. High belt tensions have been tried when using metallic belts in order to obtain suitable tracking, but the high tension causes wear and tear on the entire equipment and increases the power required to operate the system. My Patents Nos. 2,592,581, 2,593,157 and 2,593,158 discloses self-centering rolls which are suitable for keeping endless belts centered under ordinary conditions. The patent to Sargent No. 207,626, dated September 3, 1878 discloses a plurality of types of endless belt and pulley arrangements, the purpose of which is to keep the belt centered. Tests have shown that some of the embodiments disclosed therein will keep the belt centered under certain conditions while others will not. The problem of keeping belts centered is magnified when the slenderness ratio (the ratio of the distance between pulleys to the width of the belt) is small. In belt conveyors the problem is also magnified due to uneven loading of the belt across its width. I have found that under severe conditions, such as when starting or stopping belts rapidly, or when the belt is unevenly loaded in any manner, none of the above devices operate satisfactorily. The arrangements of the Lorig and Sargent patents will not prevent the belts from jumping off the pulleys when starting or stopping rapidly under load nor when the external load is not uniformly applied over the width of the belt. Even in the arrangement shown in Figure 3 of the Sargent patent, which is the best operating arrangement shown therein, the belt will vibrate laterally. This causes undue wear on the groove of the belt so that it must be discarded after a relatively short time. One reason for this is that the groove in the belt wears rapidly until it becomes so wide that the belt will not stay on the pulley under any conditions. Apparatus suitable for keeping belts centered under severe conditions is disclosed in the copending application to Orr, Serial No. 217,989, now abandoned. However, the apparatus disclosed in the Orr application causes working of the edges of the belt which is not satisfactory in some installations.

It is an object of my invention to provide apparatus which automatically centers a moving endless belt of either high or low modulus of elasticity.

Another object is to provide an endless belt which can be maintained in centered position on pulleys.

Still another object is to provide apparatus for automatically centering a flat wire conveyor belt.

These and other objects will be more apparent after referring to the following specification and attached drawings, in which:

Figure 1 is a plan view of one form of my apparatus;
Figure 2 is a side view of Figure 1;
Figure 3 is an enlarged view of one form of belt used with the apparatus of Figure 1;
Figure 4 is a view, similar to Figure 3, showing another type of belt;
Figure 5 is a sectional view of a pulley;
Figure 6 is a fragmentary view of a flat wire conveyor belt passing around a pulley;
Figure 7 is a plan view of the conveyor belt of Figure 6; and
Figure 8 is a sectional view taken on the line VIII—VIII of Figure 6.

Referring more particularly to the drawings, the reference numeral 2 indicates an endless belt which passes around spaced apart automatic centering rolls or pulleys 4 and 6. As shown, each of the automatic centering pulleys is of the type disclosed in my Patent No. 2,593,158. However, these automatic centering pulleys may also be of the type disclosed in my Patent No. 2,593,157. Each of the automatic centering pulleys is made up of a pair of opposed frusto conical rolls 8 which are arranged with their large diameter ends adjacent each other. Each of the rolls 8 consists of a rim portion fastened by means of a web to a hub portion 12 which is keyed to a rotatable shaft 14. The shaft 14 is mounted in bearings 16 and the bearings for at least one of the pulleys are mounted for adjustment on a bed plate 18 in order to permit the axes of the pulleys 4 and 6 to be arranged in parallelism. One of the shafts 14 extends beyond the bearing 16 in order to provide means for driving the roll. For example, shaft extension 20 may have a gear 22 mounted thereon which is driven by a pinion 24. A raised center ring 26 of uniform width or cross section is provided on the end of each roll 8 adjacent the opposite roll. The outer diameter of the rings 26 need only be several hundredths or thousandths of an inch larger than the pulley diameter immediately adjacent thereto. The belt 2 has a center groove 28 therein which is of such a width as to receive the rings 26. The width of the groove 28 is greater than the combined width of the rings 26 and at least as great as the combined width of the rings and the space therebetween at the first point of contact of the belt on the pulley. In other words the width of the groove 28 is at least equal to the distance between the outer side walls of the flanges 26 at the point where the belt first contacts the pulley. The total width of the groove preferably should not be more than one-tenth the total width of the belt and in no instance should be more than one-fourth of the width of the belt. The belt may be of various types. The belt of Figure 3 is made of a metal strip 30 having a pair of friction liners 32 which are spaced apart to provide a groove 28. As shown in Figure 4 the belt is made of rubber with a molded groove 28 therein.

The operation of the device is as follows:

As the belt moves toward either of the pulleys, the sides of the groove 28 engage the sides of the rings 26, thus positioning the belt in centered position. The width of the groove 28 at the initial point of engagement with the pulley must be sufficient to engage the rings 26 of both rolls 8. Since the axes of rotation of the rolls of each pulley diverge from the center of the pulley away from the direction of approach of the belt the rings 26 approach each other as they move from the initial point of belt contact as best shown in Figure 1. After the belt is in centered position the centering ability of the self-centering pulley comes into effect to hold the sides of the groove 28 out of contact with the sides of the rings 26 except when abnormal conditions prevail. Thus, the rings 26 act only as an initial guide and there is no bearing of the sides of the rings against the sides of the groove except over a very limited arc. The result of this is that the groove does not become worn and the belt life is greatly increased. It should be noted that the construction of the self-centering pulleys shown in each of my Patents Nos. 2,593,157 and 2,593,158 include a pair of rolls which rotate on axes which diverge under load from the transverse center of the pulley away from the direction of belt approach.

The pulley shown in Figure 5 is similar to that of Figures 1 and 2 but is used with a relatively narrow belt.

Figures 6, 7 and 8 show my invention being used with a flat wire conveyor belt. These belts are extremely difficult to keep centered and for that reason have previously been used only with edge chains and sprockets attached to the belt edges and pulley ends respectively. These belts consist of a plurality of flat wires 36 bent into a plurality of waves as best shown in Figure 7. The flat wires 36 are nested together and connected by means of a pin 38 passing through openings in the wires 36. As best shown in Figure 8 a groove 40 is provided between the center legs 42 of the bent wire 36. The lower surface of the crests 44 of the waves in the wires 36 are above the lower surface of the legs 42 so that the legs 42 will contact the roll whereas the crests 44 will not. I have found that even this type of belt can be kept centered by means of the apparatus of my invention.

While several embodiments of my invention has been shown and described it will be apparent that other adaptations and modifications may be made without departing from the scope of the following claim.

I claim:

Belt driving apparatus comprising a pair of spaced apart pulleys, and an endless belt passing around said pulleys, at least one of said pulleys being a self-centering pulley, said self-centering pulley including a pair of rolls mounted for rotation on axes which diverge under load from the transverse center of the pulley away from the direction of belt approach, each roll having a raised central ring therearound adjacent the other roll, each of said rings having a uniform width around its periphery, the inner surface of said belt having a continuous central groove therein for receiving said central rings, the width of said groove being greater than the combined width of said rings and at least as great as the combined width of said rings and the space therebetween at the first point of contact of the belt on the pulley but not exceeding one-tenth the total width of the belt.

References Cited in the file of this patent

UNITED STATES PATENTS

| | | |
|---|---|---|
| 207,626 | Sargent | Sept. 3, 1878 |
| 2,429,119 | Bloomfield | Oct. 14, 1947 |
| 2,593,158 | Lorig | Apr. 15, 1952 |